United States Patent Office 3,211,690
Patented Oct. 12, 1965

3,211,690
SECONDARY PLASTICIZER
Kyle W. Resh, Baltimore, Md., assignor to Continental Oil Company, Ponca City, Okla., a corporation of Delaware
No Drawing. Filed Jan. 15, 1960, Ser. No. 2,575
12 Claims. (Cl. 260—31.8)

This invention relates to alkyl aromatic hydrocarbons and their use as secondary plasticizers for polyvinylchloride resins, and, more particularly, to the alkyl aromatic hydrocarbons formed by the alkylation of toluene with a pentamer of propylene.

The use of plasticizer extenders, known also as secondary plasticizers, is common in the formation of polyvinylchloride plastics. The primary plasticizers (such as dioctyl phthalate, tricresyl phosphate, dibutoxyethyl phthalate, butoxy glycol phthalate, and dibutyl sebacate, etc.) are quite expensive, and it is desirable to extend them with cheaper materials when possible.

Aromatic petroleum hydrocarbons, and even alkyl aromatic hydrocarbons, have been employed as secondary plasticizers; however, the particular alkyl aromatic hydrocarbon of the present invention has not heretofore been so employed. This material possesses certain outstanding characteristics which make it particularly suitable as a secondary plasticizer.

The objects of this invention are to provide a secondary plasticizer which is economical to produce, and which has the following properties: water-white, odorless, stable to light and heat, flexible at low temperatures, compatible to a high degree, low initial and aged viscosities in plastisols and organosols, low extractability in soap solutions, good wetting and internal lubricating, and good pigment wetting.

Broadly stated, the present invention relates to a method of extending a primary plasticizer comprising the step of adding thereto an alkyl aromatic hydrocarbon resulting from the alkylation of toluene with a pentamer of propylene.

A suitable propylene pentamer fraction has a boiling range of from about 410° F. to about 540° F. This fraction is preferably obtained from the catalytic polymerization of propylene-containing fractions. In catalytic polymerization (a technique well known in the art of petroleum refining), the polymers are separated by fractionation to form dodecene, post dodecene, nonene, and gaseous products. The post dodecene is then fractionated to provide the desired pentamer fraction.

Preferably the alkylation is carried out in the presence of an aluminum chloride catalyst. A suitable process flow is shown and described in the co-pending application of Robert L. Kylander, Serial No. 666,700, filed June 19, 1957, now Patent No. 2,941,015 which is hereby made a part of this specification. A slurry of aluminum chloride and aromatic hydrocarbon (in this case nitration grade toluene), and the olefin (propylene pentamer), are introduced into the reactor in which are maintained conditions of moderate pressure and vigorous agitation. Water is also used to promote the reaction, in an amount equal to about 4 percent of the weight of the aluminum chloride. The reactor is cooled to maintain the temperature in the range of from about 109° F. to about 154° F., and preferably about 113°–118° F.

The amount of aluminum chloride may range from about 4 to 8 percent based on the amount of olefin. The lower limit of 4 percent is preferred, but can be realized only by recycling the catalyst sludge complex in an amount ranging from 11 to 15 percent based on the amount of olefin.

The mole ratio of aromatic to olefin may range from about 4 to 7.5, although 7.5 is preferred.

The crude alkylate from the reactor is passed to settlers (separators) for removal of catalyst sludge. As indicated above, this sludge may be recycled to the reactor, resulting in savings in aluminum chloride requirements. The effluent is then washed with 66° Bé. sulfuric acid (preferably about 2 weight percent based on crude), after which it is neutralized with a 1 percent caustic solution.

The neutralized crude alkylate is then fractionated in a series of three fractionating steps. In the first step, toluene is recovered as overhead and is recycled. In the second step, an intermediate alkylate is taken off as overhead. This intermediate fraction is a by-product, and preferably is recycled to the reactor to suppress its own formation and to reduce consumption of aromatic and olefin. In the third step, the product alkylate, having a boiling range of from about 560° F. to about 700° F. (preferably from about 595° F. to about 695° F.), is recovered, and the poly alkylate is taken off as bottoms. The alkylate product has an S.U.S. viscosity of about 80–85 at 100° F., and an average molecular weight of about 280. Typical physical properties are as follows:

Physical form _____ Oily liquid.
Color _____ Water white, slightly fluorescent.
Odor _____ Odorless.
Specific Gravity:
    at 60° F. _____ 0.878.
    at 100° F. _____ 0.864.
Molecular weight _____ 280.
Bromine number _____ 0.20.
Aniline point _____ 35° C.
Viscosity in centipoise at
    100° F. _____ 13.6.
S.U.S. at 100° F. _____ 83.2.
Flash point (C.O.C.) _____ 312° F.
Flash point (C.O.C.) for blend
    70% DOP/30% alkylate ____ 350° F.
Freezing point _____ Below —55° F.
Distillation range _____ 595°–695° F.
Refraction index at 20° C. ___ 1.4901.

It is this alkylate product which has been found to possess desirable characteristics when employed as a secondary plasticizer in polyvinylchloride formulations. It is suited to use with extrusion and dispersion grade resins, and may also be used in plastisol and organosol formulations. The maximum compatibility of this product is about 30–35 percent of the total plasticizer content, and if other secondary plasticizers are also used, the total secondary plasticizer content should not be more than 30–35 percent of the plasticizer content.

There is nothing unusual about the manner of use of the secondary plasticizer of this invention; accordingly, details as to the techniques for preparing polyvinylchloride formulations have been omitted from this specification. In Tables I and II, however, several formulations are given in terms of quantities by weight.

Table I

| Ingredients (extrusion grade) | Formula | | | | | |
|---|---|---|---|---|---|---|
| | 1 | 2 | 3 | 4 | 5 | 6 |
| PVC Extrusion Resin ("Geon 101 EP"* Resin) | 100 | 100 | 100 | 100 | 100 | 100 |
| Calcium Carbonate Filler | 20 | 20 | 20 | 20 | 20 | 20 |
| TiO₂ Pigment | 2 | 2 | 2 | 2 | 2 | 2 |
| Barium/Cadmium Stabilizer | 2 | 2 | 2 | 2 | 2 | 2 |
| Dioctylphthalate | 50 | 45 | 42.5 | 40 | 37.5 | 35 |
| Alkylate | | 5 | 7.5 | 10 | 12.5 | 15 |

*B.F. Goodrich.

Extrusion grade test sheets of 40 or 75 mil thickness were made as follows: resin—filler—pigment—stabilizer were heated to a temperature of about 160° F. Separately, the plasticizers were raised to the same temperature and then added and mixed for ten to fifteen minutes until a dry homogeneous blend was achieved. The dry blend was milled on a roll mill for five minutes at 350° F. The milled sheet was pressed polished for test specimens.

*Table II*

| Ingredients (dispersion grade) | Formula | | | | | |
|---|---|---|---|---|---|---|
| | 7 | 8 | 9 | 10 | 11 | 12 |
| PVC Dispersion Resin ("Geon 121" Resin) | 100 | 100 | 100 | 100 | 100 | 100 |
| Barium/Cadmium Stabilizer | 3 | 3 | 3 | 3 | 3 | 3 |
| Dioctylphthalate | 60 | 54 | 51 | 48 | 45 | 42 |
| Alkylate | | 6 | 9 | 12 | 15 | 18 |

Plastisol test sheets of 40 or 75 mil thickness were made by blending the resin and the plasticizer in a planetary-type mixer. Test sheets were fused at 350° F. in a laboratory press using A.S.T.M. cavity molds. In both cases, sheets were aged 24 hours before any tests were performed.

Table III shows the results of various tests carried out on specimens of formulations 1–12, above.

*Table III*

| Tensile Properties | Formula | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 100% modulus, p.s.i. | 1,802 | 1,924 | 1,939 | 2,013 | 2,011 | 2,106 | 1,161 | 1,179 | 1,264 | 1,267 | 1,345 | 1,452 |
| Break Strength, p.s.i. | 2,678 | 2,740 | 2,743 | 2,813 | 2,741 | 2,749 | 2,238 | 2,319 | 2,345 | 2,303 | 2,386 | 2,359 |
| Total Elongation, Percent | 258 | 245 | 263 | 260 | 257 | 251 | 330 | 331 | 327 | 310 | 326 | 307 |
| Volatility: Weight Loss, Percent | 0.59 | 2.00 | 2.60 | 3.07 | 3.59 | 4.14 | 2.57 | 5.05 | 6.40 | 7.14 | 7.86 | 9.03 |
| Extractability: | | | | | | | | | | | | |
| With soap solution, percent loss | 0.59 | 0.74 | 0.80 | 0.90 | 0.86 | 0.91 | 2.78 | 2.99 | 3.06 | 3.33 | 3.51 | 3.99 |
| With gasoline, percent loss | 0.98 | 5.02 | 4.90 | 5.30 | 6.51 | 8.01 | 15.22 | 19.21 | 20.21 | 21.98 | 25.13 | 24.79 |
| With mineral oil, percent loss | 1.53 | 1.80 | 2.05 | 2.25 | 2.87 | 3.05 | 5.11 | 7.38 | 9.26 | 10.91 | 14.38 | 17.20 |
| Low Temperature Flex $(T_f)$*: $T_f$, °F | −18 | −20 | −18 | −20 | −20 | −22 | −43 | −52 | −54 | −49 | −50 | −54 |
| Hardness: Durometer A-2 | 87 | 89 | 90 | 91 | 92 | 93 | 79 | 79 | 80 | 81 | 83 | 85 |
| Viscosity (Brookfield 20 r.p.m. cps.): | | | | | | | | | | | | |
| Initial | | | | | | | 9,000 | 8,300 | 8,000 | 7,900 | 7,600 | 6,400 |
| 3 Days | | | | | | | 17,000 | 12,500 | 11,400 | 11,100 | 10,700 | 9,400 |
| 1 Week | | | | | | | 21,100 | 14,900 | 12,900 | 12,600 | 11,900 | 10,400 |
| 2 Weeks | | | | | | | 23,000 | 15,700 | 13,300 | 13,000 | 12,000 | 10,500 |

*$T_f$=Temperature at which torsional modulus of elasticity=135,000 p.s.i.

A compatibility test showed favorable results in all of the above formulations (except Formula 12, which tested out as slightly incompatible instead of compatible).

The heat stability of all samples was very good in the extrusion grade formulations, with slight yellowing in all samples after three hours at 300° F. The heat stability of all of the dispersion grade formulations was excellent, with only very slight discoloration after three hours at 300° F.

The light stability of all samples was excellent, no degradation being displayed after 400 standard fade hours.

*Table IV*

TEST PROCEDURES

Tensile Properties—A.T.S.M. D 638–52T procedure using a Dillion Universal Tester. Samples cut from 75 mil sheets.

Low Temperature Flex $(T_f)$—A.S.T.M. D 1043–51 procedure using samples of 75 mil sheet.

Viscosity—Brookfield viscometer, model RVF, spindle No. 6, 20 r.p.m.

Hardness—A.S.T.M. D 676–49T procedure using Shore Durometer "A2" on 75 mil sheet.

Extractability—Soap solution. Samples of 40 mil sheet immersed in 1 percent solution of Ivory Soap for 24 hours at 140° F.

Gasoline. Samples of 40 mil film immersed in white gasoline for 1 hour at 75° F.

Mineral Oil. Samples of 40 mil sheet immersed in refined mineral oil for 10 days. Oil changed after 5 days.

Light Stability—Samples of 40 mil sheet were exposed for 50 Standard Fading Hours in an Atlas Fade-Ometer.

Heat Stability—Samples of 40 mil sheet are heated in a forced-circulation oven at 300° F. Samples are removed at 1, 1½, 2, and 3-hour periods and checked for signs of heat degradation.

Volatility—A.S.T.M. D 1203–52T. 40 mil sheet.

Compatibility—Strips of 75 mil slab were clamped into a ¾-inch loop and held 24 hours at room temperature, after which the inside of the loop was examined for exuded plasticizer.

Thus it can be seen that this invention provides a secondary plasticizer which can be readily manufactured from relatively inexpensive raw materals, and which may be employed to reduce the substantially required amount of primary plasticizer without having detrimental effects upon the properties of the ultimate polyvinylchloride formulations.

It will be understood that the examples included herein are illustrative only and that our invention is to be taken as limited only by the scope of the appended claims.

I claim:
1. The method of extending a primary plasticizer comprising the step of adding thereto an alkyl aromatic hydrocarbon having been prepared by the alkylation of toluene with a pentamer of propylene, said hydrocarbon having a boiling range of from about 560° F. to about 700° F.

2. The method of claim 1 wherein the primary plasticizer is dioctylphthalate.

3. The method of extending a primary plasticizer comprising the step of adding thereto an alkyl aromatic hydrocarbon having been prepared by the alkylation of toluene with a pentamer of propylene, said hydrocarbon having a boiling range of from about 595° F. to about 695° F.

4. The method of claim 3 wherein the primary plasticizer is dioctylphthalate.

5. The method of extending a primary plasticizer comprising the step of adding thereto an alkyl aromatic hydrocarbon having been prepared by the alkylation of toluene with a pentamer of propylene, said hydrocarbon having a boiling range of from about 595° F. to about 695° F. and an average molecular weight of about 280.

6. The method of claim 5 wherein the primary plasticizer is dioctylphthalate.

7. A plasticized polyvinyl chloride composition wherein the plasticizer comprises a major portion of a primary plasticizer and a minor portion of an alkyl aromatic hydrocarbon having been prepared by the alkylation of toluene with a pentamer of propylene, said hydrocarbon having a boiling range of from about 560° F. to about 700° F.

8. The composition of claim 7 wherein the primary plasticizer is dioctyl phthalate.

9. A plasticized polyvinyl chloride composition wherein the plasticizer comprises a major portion of a primary plasticizer and a minor portion of an alkyl aromatic hydrocarbon having been prepared by the alkylation of toluene with a pentamer of propylene, said hydrocarbon having a boiling range of from about 595° F. to about 695° F.

10. The composition of claim 9 wherein the primary plasticizer is dioctyl phthalate.

11. A plasticized polyvinyl chloride composition wherein the plasticizer comprises a major portion of dioctyl phthalate and a minor portion, up to 25 percent, of an alkyl aromatic hydrocarbon having been prepared by the alkylation of toluene with a pentamer of propylene, said hydrocarbon having a boiling range of from about 560° F. to about 700° F.

12. A plasticized polyvinyl chloride composition wherein the plasticizer comprises a major portion of dioctyl phthalate and a minor portion, up to 25 percent, of an alkyl aromatic hydrocarbon having been prepared by the alkylation of toluene with a pentamer of propylene, said hydrocarbon having a boiling range of from about 595° F. to about 695° F.

References Cited by the Examiner
UNITED STATES PATENTS

| | | | |
|---|---|---|---|
| 2,142,279 | 1/39 | Menger | 260—31.8 |
| 2,941,015 | 6/60 | Kylander | 260—671 |
| 2,948,695 | 8/60 | Ford et al. | 260—33.6 |
| 2,986,545 | 5/61 | Fitzpatrick et al. | 260—31.8 |
| 3,011,990 | 12/61 | Roh et al. | 260—31.8 |
| 3,042,644 | 7/62 | Cowell et al. | 260—31.8 |

MORRIS LIEBMAN, *Primary Examiner.*

DANIEL ARNOLD, LEON J. BERCOVITZ, LESLIE H. GASTON, *Examiners.*